United States Patent
Shapiro et al.

(10) Patent No.: US 9,518,474 B2
(45) Date of Patent: Dec. 13, 2016

(54) CONTINUOUS RING COMPOSITE TURBINE SHROUD

(71) Applicant: General Electric Company, Schenectady, NY (US)

(72) Inventors: Jason David Shapiro, Methuen, MA (US); Jared Peter Buhler, Tewksbury, MA (US); Brian Kenneth Corsetti, Stoneham, MA (US)

(73) Assignee: General Electric Company, Schenectady, NY (US)

( * ) Notice: Subject to any disclaimer, the term of this patent is extended or adjusted under 35 U.S.C. 154(b) by 506 days.

(21) Appl. No.: 14/220,434

(22) Filed: Mar. 20, 2014

(65) Prior Publication Data
US 2014/0202168 A1  Jul. 24, 2014

Related U.S. Application Data

(63) Continuation-in-part of application No. 13/075,740, filed on Mar. 30, 2011, now Pat. No. 8,985,944.

(51) Int. Cl.
*F01D 11/00* (2006.01)
*F01D 11/08* (2006.01)
(Continued)

(52) U.S. Cl.
CPC .............. *F01D 11/08* (2013.01); *F01D 9/04* (2013.01); *F01D 11/18* (2013.01); *F01D 25/246* (2013.01); *F05D 2300/603* (2013.01)

(58) Field of Classification Search
CPC ............ F01D 9/04; F01D 11/18; F01D 11/08; F01D 25/246; F05D 2300/603
See application file for complete search history.

(56) References Cited

U.S. PATENT DOCUMENTS 5,295,787 A * 3/1994 Leonard ................ F01D 11/18
                                                          415/134
5,797,723 A   8/1998 Frost et al.
(Continued)

FOREIGN PATENT DOCUMENTS

JP    63170506 A    7/1988
JP    09504588 A    5/1997
(Continued)

OTHER PUBLICATIONS

Unofficial English translation of Japanese Office Action issued in connection with corresponding JP Application No. 2012-072661 on Mar. 22, 2016.

*Primary Examiner* — Igor Kershteyn
(74) *Attorney, Agent, or Firm* — General Electric Company; William Scott Andes

(57) ABSTRACT

A composite annular shroud supported by a support assembly including at least one ring and at least partially disposed within the ring. The shroud is biased against and in sealing engagement with an inner flange of the ring. A three ring assembly includes the inner ring disposed radially inwardly of a middle ring disposed radially inwardly of an outer ring and the shroud at least partially disposed within the inner ring. At least three clocking pins extend radially inwardly from the middle ring through slots in the inner ring into notches in the shroud. The middle ring may be an aft end of a support ring fixedly connected to an engine backbone. Mounting pins may be press fitted into pin holes in the middle ring and extend radially outwardly from the middle ring through radial holes in the outer ring.

23 Claims, 6 Drawing Sheets

(51) Int. Cl.
*F01D 9/04* (2006.01)
*F01D 11/18* (2006.01)
*F01D 25/24* (2006.01)

(56) References Cited

U.S. PATENT DOCUMENTS

| | | | |
|---|---|---|---|
| 5,927,942 A | 7/1999 | Stahl et al. | |
| 6,340,286 B1 * | 1/2002 | Aksit | F01D 11/122 |
| | | | 415/173.3 |
| 6,454,529 B1 * | 9/2002 | Zearbaugh | F01D 11/24 |
| | | | 415/173.2 |
| 6,659,472 B2 | 12/2003 | Aksit et al. | |
| 6,702,550 B2 | 3/2004 | Darkins, Jr. et al. | |
| 6,726,391 B1 * | 4/2004 | Kreis | F01D 25/246 |
| | | | 415/173.1 |
| 6,733,235 B2 * | 5/2004 | Alford | F01D 11/08 |
| | | | 415/173.1 |
| 6,814,538 B2 | 11/2004 | Thompson | |
| 6,932,566 B2 | 8/2005 | Suzumura et al. | |
| 7,052,235 B2 * | 5/2006 | Alford | F01D 9/04 |
| | | | 415/173.1 |
| 7,189,057 B2 * | 3/2007 | Lee | F01D 11/16 |
| | | | 415/128 |
| 8,079,807 B2 | 12/2011 | Shapiro et al. | |
| 8,167,546 B2 | 5/2012 | Shi et al. | |
| 2010/0154433 A1 | 6/2010 | Ottaviano et al. | |

FOREIGN PATENT DOCUMENTS

| | | |
|---|---|---|
| JP | 2003227355 A | 8/2003 |
| JP | 2004076601 A | 3/2004 |
| JP | 2004169655 A | 6/2004 |
| JP | 2004225698 A | 8/2004 |

* cited by examiner

CONTINUOUS RING COMPOSITE TURBINE SHROUD

CROSS REFERENCE TO RELATED APPLICATION

This application is a continuation of and claims priority to U.S. Utility application Ser. No. 13/075,740, filed on Mar. 30, 2011, entitled "CONTINUOUS RING COMPOSITE TURBINE SHROUD", which is incorporated herein by reference in its entirety.

BACKGROUND OF THE INVENTION

Technical Field

The present invention relates generally to gas turbine engine turbine shrouds and, more specifically, mounting and sealing of such shrouds.

Background Information

A conventional gas turbine engine typically includes a compressor, combustor and turbine, both rotating turbine components such as blades, disks and retainers, and stationary turbine components such as vanes, shrouds and frames routinely require cooling due to heating thereof by hot combustion gases.

The high pressure turbine (HPT) stages typically maintain a very small tip clearance between turbine blade tips and shrouds surrounding the tips. Shroud supports maintain the shrouds in desired position relative to the rotating blade tips to control clearances between the shrouds and blades. The tip clearance should be made as small as possible for good efficiency, however, the tip clearance is typically sized larger than desirable for good efficiency because the blades and turbine shroud expand and contract at different rates during the various operating modes of the engine.

The shroud is conventionally an assembly of a plurality of gas turbine engine stationary shroud segments assembled circumferentially about an axial flow engine axis and located radially outwardly about rotating blading members and defines a part of the radial outer flowpath boundary around the blades.

The shroud segment and shroud assembly must be capable of meeting the design life requirements selected for use in a designed engine operating temperature and pressure environment. To enable current materials to operate effectively as a shroud in the strenuous temperature and pressure conditions as exist in the turbine section flowpath of modem gas turbine engines, it has been a practice to provide cooling air to a radially outer portion of the shroud. However, as is well known in the art such cooling air is supplied at the expense of engine efficiency. Therefore, it is desired to conserve use of cooling air by minimizing leakage into the flowpath of the engine of cooling air not designed in the engine.

Composite and, in particular, ceramic matrix composite (CMC) materials have been suggested for use in shroud segments because they have a higher temperature capability than the metallic type materials currently in use. However, such materials, forms of which are referred to commercially as a ceramic matrix composite (CMC), have mechanical properties that must be considered during design and application of an article such as a shroud segment. CMC type materials have relatively low tensile ductility or low strain to failure when compared with metallic materials. Also, CMC type materials have a coefficient of thermal expansion (CTE) significantly different from metal alloys used as restraining supports or hangers for shrouds of CMC type materials.

Therefore, if a CMC type of shroud segment is restrained and cooled on one surface during operation, forces can be developed in CMC type segment sufficient to cause failure of the segment.

Generally, commercially available CMC materials include a ceramic type fiber, for example SiC, forms of which are coated with a compliant material such as BN. The fibers are carried in a ceramic type matrix, one form of which is SiC.

The turbine shroud directly affects overall efficiency or performance of the gas turbine engine due to the size of the tip clearance. The turbine shroud additionally affects performance of the engine since any compressor discharge and/or bleed air used for cooling the turbine shroud is therefore not used during the combustion process or the work expansion process by the turbine blades and is unavailable for producing useful work.

Accordingly, it is desirable to control or reduce the amount of bleed air used in cooling the turbine shroud for maximizing the overall efficiency of the engine. It is also desirable to use CMC materials in the shroud because they have a higher temperature capability than the metallic type materials currently in use.

BRIEF DESCRIPTION OF THE INVENTION

A gas turbine engine turbine shroud assembly includes a composite annular shroud supported by a shroud support assembly including at least one ring. The shroud is at least partially disposed within the ring. An axial biasing means biases the shroud against and in sealing engagement with an annular inwardly extending inner flange of the ring.

An exemplary embodiment of the gas turbine engine turbine shroud assembly includes metallic and concentric inner, middle, and outer rings. The least one ring is the inner ring and is disposed radially inwardly of the middle ring, the middle ring is disposed radially inwardly of the outer ring, and the shroud is at least partially disposed within the inner ring. At least three clocking pins may extend radially inwardly from the middle ring through axially extending slots in the inner ring into axially extending notches in the shroud. The axial biasing means may be an M-seal or a bellows seal.

The middle ring may be integral with and form an aft end of a turbine shroud support ring and the turbine shroud support ring may be fixedly connected to and supported by an engine backbone. The engine backbone may include at least a portion of a combustor casing and a turbine casing. A turbine shroud support ring flange at a forward end of the turbine shroud support ring may be axially disposed between and bolted to a downstream combustor casing flange of the combustor casing and an upstream turbine casing flange of the turbine casing.

An annular outwardly extending outer flange of the inner ring may axially disposed and trapped between an aft facing end surface of the middle ring and an annular inwardly extending end flange of the outer ring at an outer ring aft end of the outer ring. Mounting pins may be press fitted into pin holes in the middle ring and extend radially outwardly from the middle ring through radial holes in the outer ring.

The M-seal or the bellows seal may be disposed between the shroud and an annular stator element fixedly connected to the turbine shroud support ring.

One alternative shroud assembly includes an annular shroud supported by a shroud support assembly including metallic and concentric combination and middle rings. The combination ring includes annular inner and outer ring portions and a central ring portion. The middle ring is disposed radially inwardly of the outer ring portion, the shroud is at least partially disposed within the inner ring portion, and an axial biasing means is used for axially biasing the shroud against and in sealing engagement with an annular inwardly extending inner flange of the combination ring.

DETAILED DESCRIPTION OF THE INVENTION

Figure 1:
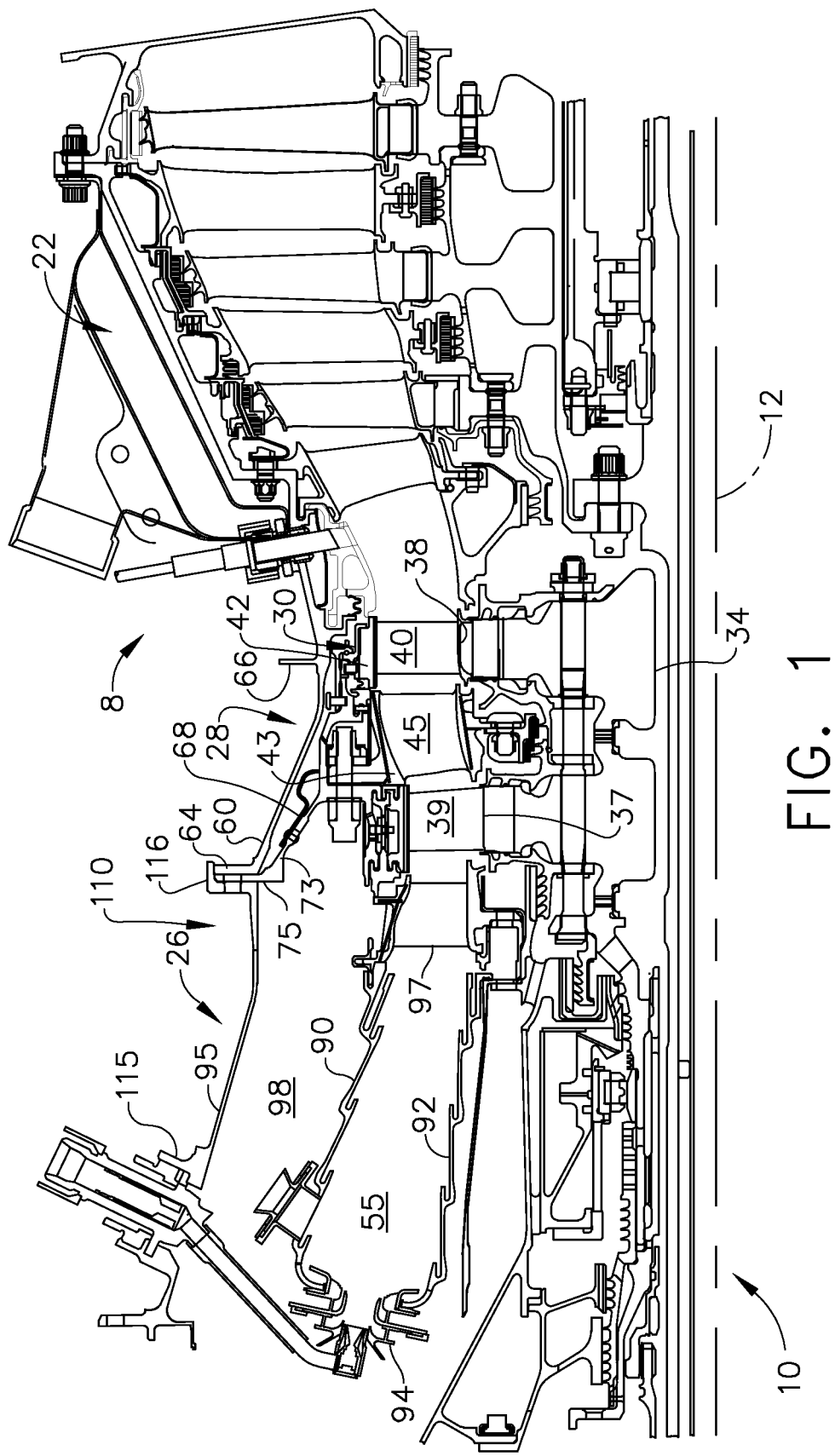
FIG. 1 is a sectional view illustration of a gas turbine engine combustor and high and low pressure turbine sections and a continuous CMC ring shroud circumscribing high pressure turbine blades.
Figure 2:
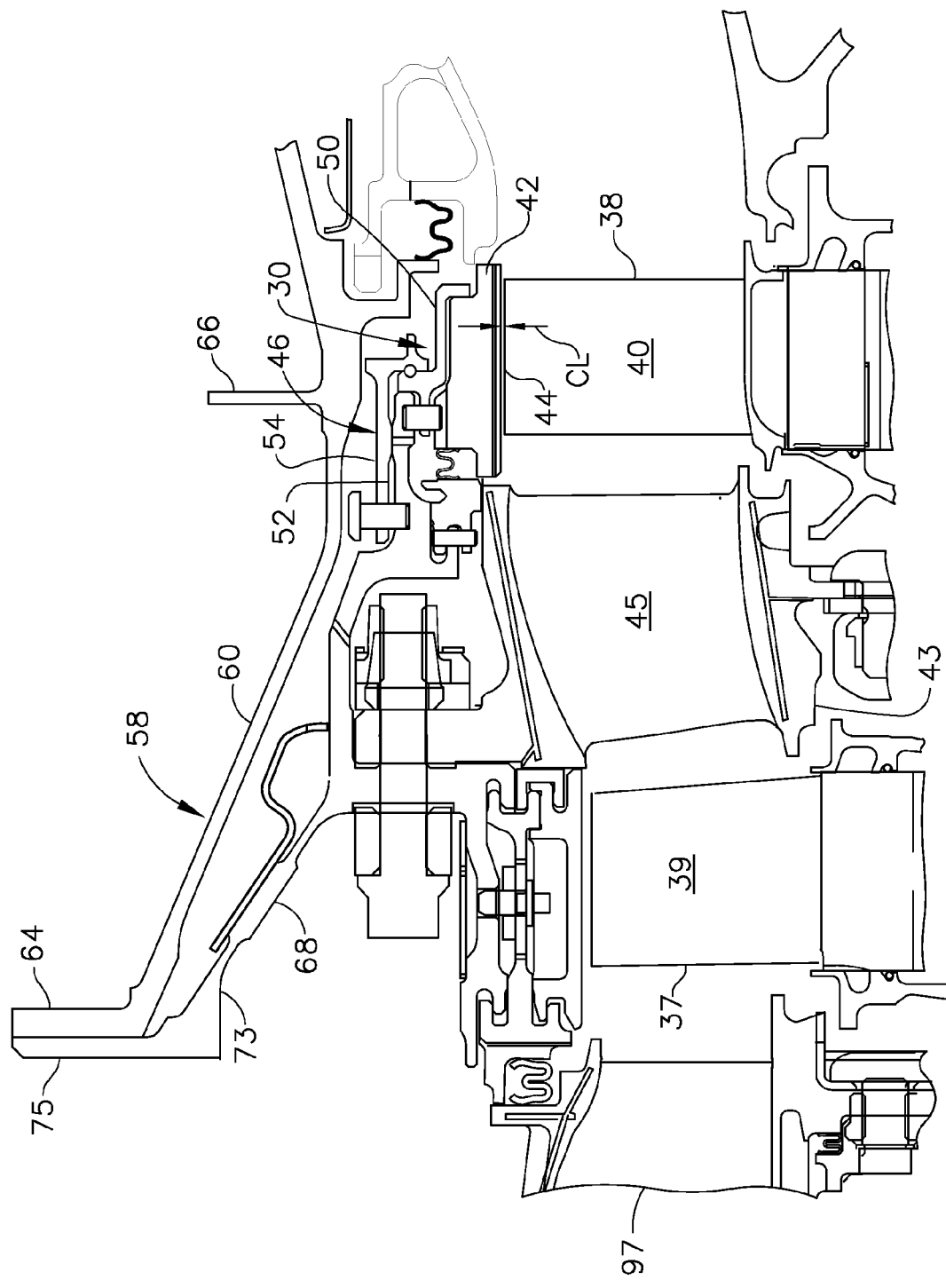
FIG. 2 is an enlarged sectional view illustration of the high pressure turbine section illustrated in FIG. 1.

Illustrated in FIGS. 1 and 2 is a hot section 8 of a gas turbine engine 10 having an engine centerline 12 and including, in downstream flow relationship, a combustor 26, a high pressure turbine 28 (HPT), and low pressure turbine 22 (LPT). The high pressure turbine 28 includes an annular rotatable high pressure turbine rotor 34. Axially spaced apart first and second stage rows 37, 38 of high pressure first and second stage turbine blades 39, 40 respectively extend radially outwardly from the high pressure turbine rotor 34. A high pressure second stage turbine nozzle 43 having high pressure second stage turbine nozzle vanes 45 is operably disposed between the first and second stage rows 37, 38 of the high pressure first and second stage turbine blades 39, 40.

A shroud assembly 30 including an annular shroud 42 circumscribing the second stage turbine blades 40 helps reduce the flow from leaking around radially outer blade tips 44 of the second stage turbine blades 40. It is desirable to minimize a radial blade tip clearance CL between the blade tips 44 and the shroud 42, particularly during cruise operation of the engine 10. Thus, the shroud 42 disclosed herein is a continuous ring made of a composite material and, more particularly, a CMC and supported by a shroud support assembly 46 including metallic and concentric inner, middle, and outer rings 50, 52, 54 connected to static structure or backbone 58 of the engine 10. The shroud assembly 30 and the multi ring shroud support assembly 46 are far less complex assemblies than conventional or present day designs.

A backbone is an engine frame that provides structural support for components that are positioned radially inwardly from the backbone and also couples an engine casing around the engine. The backbone facilitates controlling engine clearance closures defined between the engine casing and components positioned radially inwardly from the backbone. The backbones are typically designed to be stiff.

The combustor 26 includes an annular outer liner 90, an annular inner liner 92, and a domed end 94 that extends between the outer and inner combustor liners 90, 92, respectively. The outer liner 90 and inner liner 92 are spaced radially inwardly from a combustor casing 95 and define a combustion chamber 55 therebetween. The combustor casing 95 is generally annular and extends around the combustor 26. The combustion chamber 55 is generally annular in shape and is radially bound by the liners 90, 92.

An outer passageway 98 is defined between the combustor casing 95 and the outer liner 90. The outer and inner liners 90, 92 extend aftwardly or downstream to a turbine nozzle 97. At least a portion of the combustor casing 95 forms a combustor backbone frame 110 that extends circumferentially around combustor 26 to provide structural support to combustor 26 within engine 10. The combustor casing 95 includes annular upstream and downstream combustor casing flanges 115, 116. In the exemplary embodiment, the upstream and downstream combustor casing flanges 115, 116 are substantially circular and are substantially parallel.

Referring to FIG. 2, a turbine casing 60 including substantially circular and parallel upstream and downstream turbine casing flanges 64, 66 and is bolted to the combustor casing 95 as illustrated in FIG. 1. A turbine shroud support ring 68 supports the inner, middle, and outer rings 50, 52, 54. The exemplary inner, middle, and outer rings 50, 52, 54 are illustrated as single piece full 360 degree rings which provide greatly reduced cooling flow leakage. The turbine shroud support ring 68 includes a turbine shroud support ring flange 75 at a forward end 73 of the turbine shroud support ring 68. The turbine shroud support ring flange 75 is axially disposed between and bolted to the downstream combustor casing flange 116 and the upstream turbine casing flange 64 as illustrated in FIG. 1. Thus, the combustor casing 95 support the turbine shroud support ring 68. The shroud 42 and the inner, middle, and outer rings 50, 52, 54 are circumscribed about the engine centerline 12.

Figure 3:
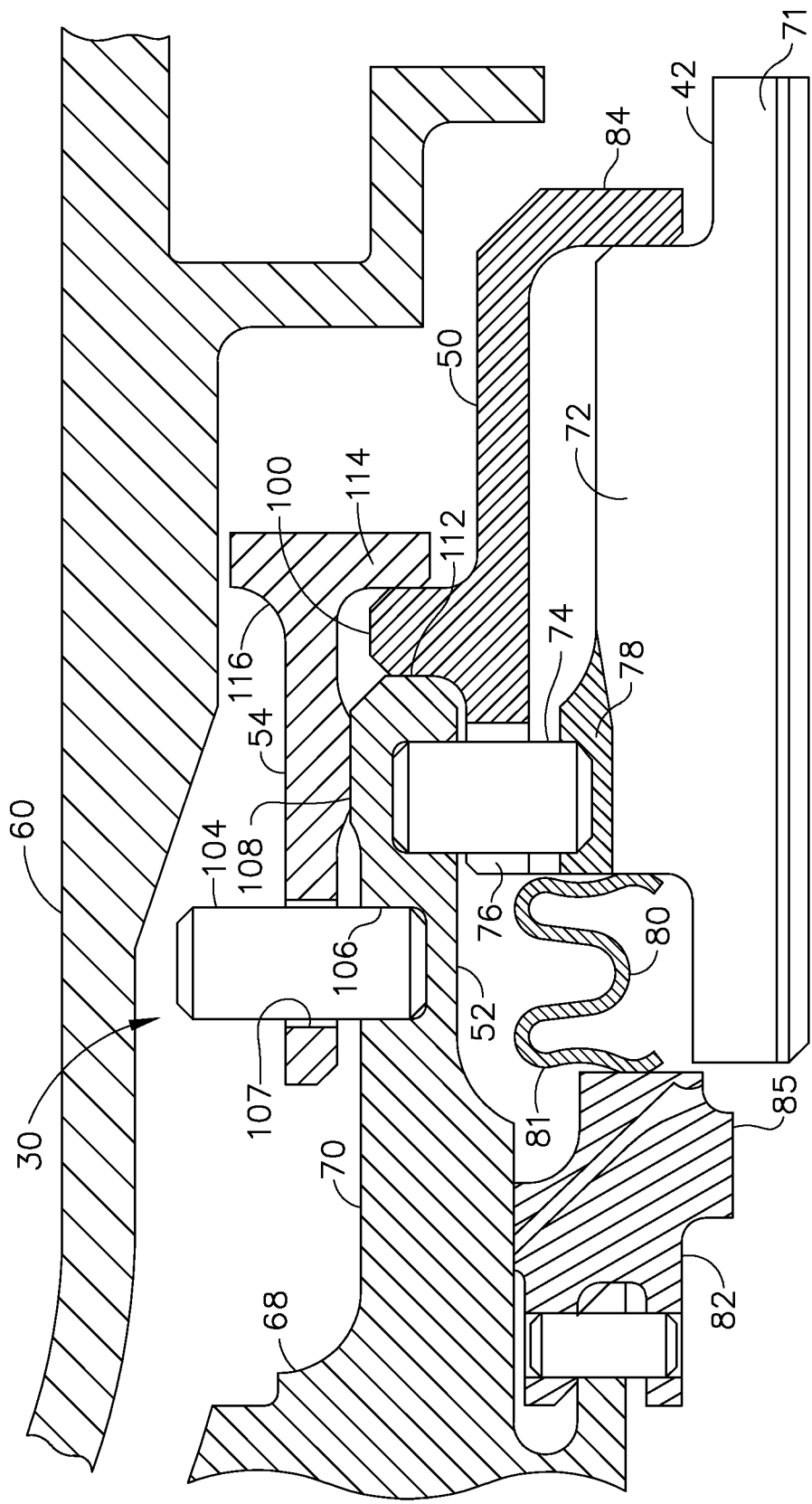
FIG. 3 is an enlarged cross sectional view illustration of the continuous CMC ring shroud illustrated in FIG. 1.
Figure 4:
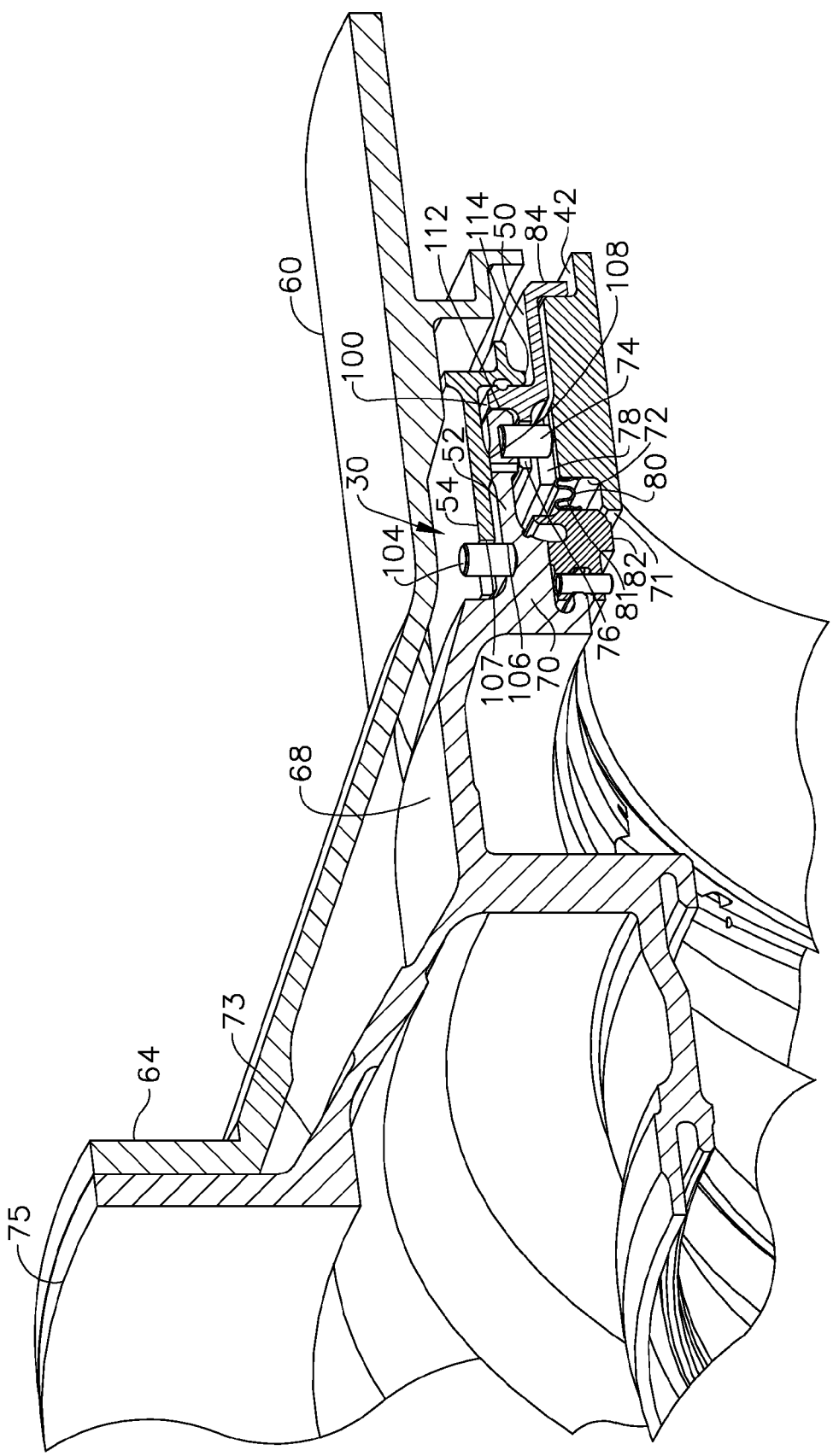
FIG. 4 is a cut-away perspective view illustration of a turbine shroud support ring supporting the continuous CMC ring shroud in FIG. 1.
Figure 5:
FIG. 5 is a cut-away perspective view illustration of the continuous CMC ring shroud supported by an annular metallic inner ring illustrated in FIG. 1.

Referring to FIGS. 3-5, the embodiment of the turbine shroud support ring 68 illustrated in FIG. 3 includes the middle ring 52 being integral with and forming an aft end 70 of the turbine shroud support ring 68. The continuous ring composite shroud 42 includes an annular radially inner portion 71 and an annular radially outer portion 72 which is axially shorter than the radially inner portion 71. Three or more clocking pins 74 extend radially inwardly from the middle ring 52 through axially extending slots 76 in the inner ring 50 into axially extending notches 78 in the shroud 42. The clocking pins 74 radially contact the shroud 42 thus preventing the shroud 42 from shifting radially off-center. Besides radially positioning the shroud 42, the clocking pins 74 prevent the shroud 42 from rotating about the engine centerline 12. The clocking pins 74 fully position the shroud 42 and allows thermal axial growth of the shroud 42.

An M-seal 80 is disposed between the shroud 42 and an annular stator element 82, illustrated herein as a hanger 85, fixedly connected to the turbine shroud support ring 68. The M-seal 80 is a particular embodiment of a bellows seal and serves as a biasing means or spring 81. The M-seal 80 provides axial biasing of the shroud 42 against and in sealing engagement with an annular inwardly extending inner flange 84 of the inner ring 50. An annular outwardly extending outer flange 100 of the inner ring 50 is axially disposed and trapped between an aft facing end surface 112 of the middle ring 52 and an annular inwardly extending end flange 114 of the outer ring 54 at an outer ring aft end of the outer ring 54.

Mounting pins 104 (four are used in the embodiment illustrated herein) press fitted into pin holes 106 in the middle ring 52 extend and radially outwardly from the middle ring 52 through radial holes 107 in the outer ring 54. The mounting pins 104 react aftwardly axial loads and prevent the inner, middle, and outer rings 50, 52, 54 from being pushed apart in the axial direction. A press fit 108 is used between the middle and outer rings 52, 54.

Figure 6:
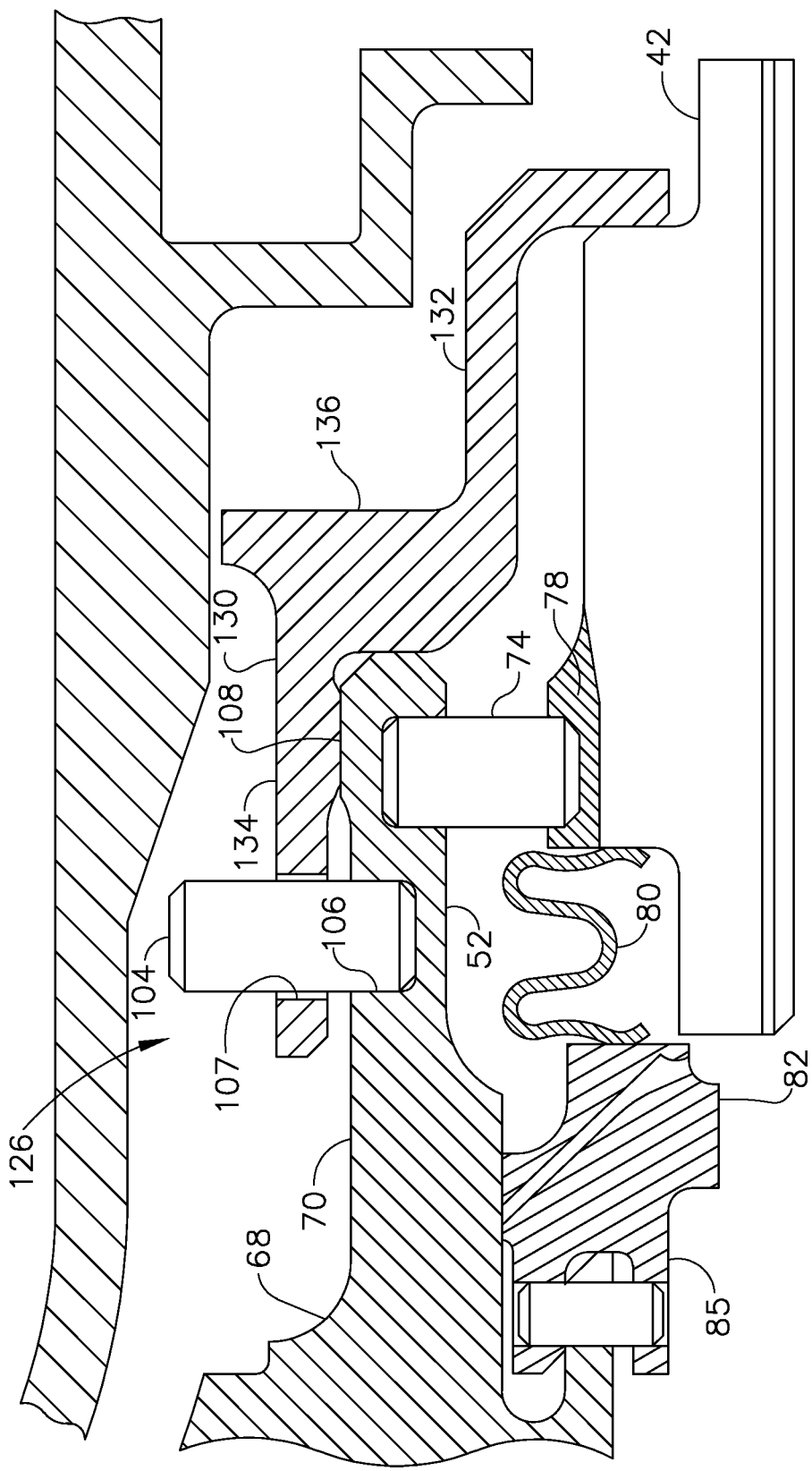
FIG. 6 is an enlarged cross sectional view illustration of a two ring support for the continuous CMC ring shroud illustrated in FIG. 1.

Illustrated in FIG. 6 is alternative shroud assembly 126 having two metallic concentric rings including the middle ring 52 integral with and forming the aft end 70 of turbine shroud support ring 68 and a combination ring 130 combining the functions of the middle and outer rings 52, 54. The combination ring 130 includes annular inner and outer ring portions 132, 134 and a central ring portion 136 therebetween. The combination ring 130 is a single piece full 360 degree ring and thus provides greatly reduced cooling flow leakage.

Three or more clocking pins 74 extend radially inwardly from the middle ring 52 into axially extending notches 78 in the shroud 42. The clocking pins 74 radially contact the shroud 42 thus preventing the shroud 42 from shifting radially off-center. Besides radially positioning the shroud 42, the clocking pins 74 prevent the shroud 42 from rotating about the engine centerline 12. The clocking pins 74 fully position the shroud 42 and allows thermal axial growth of the shroud 42.

The mounting pins 104 (four are used in the embodiment illustrated herein) press fitted into pin holes 106 in the middle ring 52 extend radially outwardly from the middle ring 52 through radial holes 107 in the outer ring portion 134. The mounting pins 104 react aftwardly axial loads and prevent the combination ring 130 from being pushed aft and apart from the middle ring 52 in the axial direction. A press fit 108 is used between the middle ring 52 and the outer ring portion 134 of the combination ring 130. An M-seal 80 is disposed between the shroud 42 and an annular stator element 82, illustrated herein as a hanger 85, fixedly connected to the turbine shroud support ring 68. The M-seal 80 provides axial biasing of the shroud 42 against and in sealing engagement with an annular inwardly extending inner flange 84 of the inner ring portion.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A gas turbine engine turbine shroud assembly comprising:
    an annular shroud supported by a shroud support assembly including at least one ring,
    the shroud being at least partially disposed within the at least one ring, and
    an axial biasing means for axially biasing the shroud against and in sealing engagement with an annular inwardly extending inner flange of the at least one ring.

2. The gas turbine engine turbine shroud assembly as claimed in claim 1, further comprising:
    concentric inner, middle, and outer rings,
    the at least one ring being the inner ring and disposed radially inwardly of the middle ring, and
    the middle ring disposed radially inwardly of the outer ring.

3. The gas turbine engine turbine shroud assembly as claimed in claim 2, further comprising at least three clocking pins extending radially inwardly from the middle ring through axially extending slots in the inner ring and into axially extending notches in the shroud.

4. The gas turbine engine turbine shroud assembly as claimed in claim 3, wherein the axial biasing means is an M-seal or a bellows seal.

5. The gas turbine engine turbine shroud assembly as claimed in claim 4, further comprising the middle ring being integral with and forming an aft end of a turbine shroud support ring and the turbine shroud support ring fixedly connected to and supported by an engine backbone.

6. The gas turbine engine turbine shroud assembly as claimed in claim 5, further comprising:
    the engine backbone including at least a portion of a combustor casing and a turbine casing,
    a turbine shroud support ring flange at a forward end of the turbine shroud support ring, and
    the turbine shroud support ring flange axially disposed between and bolted to a downstream combustor casing flange of the combustor casing and an upstream turbine casing flange of the turbine casing.

7. The gas turbine engine turbine shroud assembly as claimed in claim 6, further comprising:
    an annular outwardly extending outer flange of the inner ring axially disposed and trapped between an aft facing end surface of the middle ring and an annular inwardly extending end flange of the outer ring at an outer ring aft end of the outer ring,
    mounting pins press fitted into pin holes in the middle ring and extending radially outwardly from the middle ring through radial holes in the outer ring, and
    the M-seal or the bellows seal being disposed between the shroud and an annular stator element fixedly connected to the turbine shroud support ring.

8. The gas turbine engine turbine shroud assembly as claimed in claim 2, further comprising the concentric inner, middle, and outer rings being inner, middle, and outer metallic rings and the shroud being a composite shroud.

9. The gas turbine engine turbine shroud assembly as claimed in claim 8, further comprising at least three clocking pins extending radially inwardly from the middle ring through axially extending slots in the inner ring and into axially extending notches in the shroud.

10. The gas turbine engine turbine shroud assembly as claimed in claim 9, wherein the axial biasing means is an M-seal or a bellows seal.

11. The gas turbine engine turbine shroud assembly as claimed in claim 10, further comprising the middle ring being integral with and forming an aft end of a turbine shroud support ring and the turbine shroud support ring fixedly connected to and supported by an engine backbone.

12. The gas turbine engine turbine shroud assembly comprising:
    an annular shroud supported by a shroud support assembly including metallic and concentric combination and middle rings,
    the combination ring including annular inner and outer ring portions and a central ring portion,
    the middle ring disposed radially inwardly of the outer ring portion,
    the shroud at least partially disposed within the inner ring portion, and an axial biasing means for axially biasing the shroud against and in sealing engagement with an annular inwardly extending inner flange of the combination ring.

13. The gas turbine engine turbine shroud assembly as claimed in claim 12, further comprising at least three clocking pins extending radially inwardly from the middle ring into axially extending notches in the shroud.

14. The gas turbine engine turbine shroud assembly as claimed in claim 13, wherein the axial biasing means is an M-seal or a bellows seal.

15. The gas turbine engine turbine shroud assembly as claimed in claim 14, further comprising:
the middle ring being integral with and forming an aft end of a turbine shroud support ring and the turbine shroud support ring fixedly connected to and supported by an engine backbone,
mounting pins press fitted into pin holes in the middle ring and extending radially outwardly from the middle ring through radial holes in the outer ring portion, and
the M-seal or the bellows seal being disposed between the shroud and an annular stator element fixedly connected to the turbine shroud support ring.

16. A gas turbine engine hot section comprising:
a combustor upstream of a high pressure turbine,
the high pressure turbine includes an annular rotatable high pressure turbine rotor,
a row of high pressure turbine blades extending radially outwardly from the high pressure turbine rotor,
a shroud assembly including a composite annular shroud circumscribing the turbine blades,
the shroud supported by a shroud support assembly including at least one ring,
the shroud being at least partially disposed within the at least one ring, and
an axial biasing means for axially biasing the shroud against and in sealing engagement with an annular inwardly extending inner flange of the at least one ring.

17. The gas turbine engine hot section as claimed in claim 16, further comprising:
concentric metallic inner, middle, and outer rings,
the at least one ring being the inner ring and disposed radially inwardly of the middle ring,
the middle ring disposed radially inwardly of the outer ring,
the shroud at least partially disposed within the inner ring, and
at least three clocking pins extending radially inwardly from the middle ring through axially extending slots in the inner ring into axially extending notches in the shroud.

18. The gas turbine engine hot section as claimed in claim 17, wherein the axial biasing means is an M-seal or a bellows seal.

19. The gas turbine engine hot section as claimed in claim 18, further comprising the middle ring being integral with and forming an aft end of a turbine shroud support ring and the turbine shroud support ring fixedly connected to and supported by an engine backbone.

20. The gas turbine engine hot section as claimed in claim 19, further comprising:
the engine backbone including at least a portion of a combustor casing and a turbine casing,
a turbine shroud support ring flange at a forward end of the turbine shroud support ring, and
the turbine shroud support ring flange axially disposed between and bolted to a downstream combustor casing flange of the combustor casing and an upstream turbine casing flange of the turbine casing.

21. The gas turbine engine hot section as claimed in claim 20, further comprising an annular outwardly extending outer flange of the inner ring axially disposed and trapped between an aft facing end surface of the middle ring and an annular inwardly extending end flange of the outer ring at an outer ring aft end of the outer ring.

22. The gas turbine engine hot section as claimed in claim 21, further comprising mounting pins press fitted into pin holes in the middle ring and extending radially outwardly from the middle ring through radial holes in the outer ring.

23. The gas turbine engine hot section as claimed in claim 22, further comprising the M-seal or the bellows seal being disposed between the shroud and an annular stator element fixedly connected to the turbine shroud support ring.

* * * * *

UNITED STATES PATENT AND TRADEMARK OFFICE
CERTIFICATE OF CORRECTION

| | | |
|---|---|---|
| PATENT NO. | : 9,518,474 B2 | Page 1 of 1 |
| APPLICATION NO. | : 14/220434 | |
| DATED | : December 13, 2016 | |
| INVENTOR(S) | : Shapiro et al. | |

It is certified that error appears in the above-identified patent and that said Letters Patent is hereby corrected as shown below:

In the Specification

In Column 1, Line 7, delete "continuation" and insert -- continuation-in-part --, therefor.

In Column 1, Line 9, delete "2011," and insert -- 2011, now Pat. No. 8,985,944, --, therefor.

In the Claims

In Column 6, Line 57, in Claim 12, delete "The gas" and insert -- A gas --, therefor.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*